United States Patent
Roy

(10) Patent No.: US 8,553,601 B2
(45) Date of Patent: *Oct. 8, 2013

(54) COMMUNICATIONS SYSTEM PROVIDING ADAPTIVE POLLING BASED UPON POSITIVE AND NEGATIVE POLLING EVENTS AND RELATED METHODS

(75) Inventor: Shaibal Roy, Sammamish, WA (US)

(73) Assignee: TeamOn Systems, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/343,400

(22) Filed: Jan. 4, 2012

(65) Prior Publication Data

US 2012/0102129 A1    Apr. 26, 2012

Related U.S. Application Data

(63) Continuation of application No. 11/831,497, filed on Jul. 31, 2007, now Pat. No. 8,094,592, which is a continuation of application No. 10/781,195, filed on Feb. 18, 2004, now Pat. No. 7,280,537.

(60) Provisional application No. 60/493,118, filed on Aug. 7, 2003.

(51) Int. Cl.
*H04L 12/58*     (2006.01)
*H04B 7/00*      (2006.01)

(52) U.S. Cl.
USPC ............... 370/310; 370/381; 455/412.1

(58) Field of Classification Search
None
See application file for complete search history.

(56) References Cited

U.S. PATENT DOCUMENTS

| | | | |
|---|---|---|---|
| 4,466,001 A | 8/1984 | Moore et al. | 340/825.08 |
| 5,566,351 A | 10/1996 | Crittenden et al. | 395/867 |
| 5,570,367 A | 10/1996 | Ayanoglu et al. | 370/94.1 |
| 5,802,292 A | 9/1998 | Mogul | 395/200.33 |
| 5,970,063 A | 10/1999 | Chapman et al. | 370/346 |
| 5,973,609 A | 10/1999 | Schoch | 340/825 |
| 5,995,503 A | 11/1999 | Crawley et al. | 370/351 |
| 6,049,549 A | 4/2000 | Ganz et al. | 370/449 |
| 6,067,561 A | 5/2000 | Dillon | 709/206 |
| 6,070,191 A | 5/2000 | Narendran et al. | 709/226 |
| 6,173,323 B1 | 1/2001 | Moghe | 709/224 |
| 6,421,732 B1 | 7/2002 | Alkhatib et al. | 709/245 |

(Continued)

FOREIGN PATENT DOCUMENTS

| WO | 02/21777 | 3/2002 |
|---|---|---|
| WO | 2004/059447 | 7/2004 |

OTHER PUBLICATIONS

Ward et al., "Method for Reducing Polling Traffic Within a Mailbox Communication System", Research Disclosure, Mason Publications, Hampshire, GB, vol. 468, No. 64, Apr. 2003, XP007132506, ISSN: 0374-4353, pp. 1-3.

*Primary Examiner* — Erika A Washington

(57) ABSTRACT

A communications system may include at least one data storage device for storing messages for respective users, and a plurality of mobile wireless communications devices each associated with a respective user for accessing the messages stored on the at least one data storage device. Moreover, the communications system may further include an adaptive polling engine for polling the at least one data storage device for stored messages and providing the polled messages to mobile wireless communications devices of respective users. The adaptive polling engine may advantageously learn respective user usage patterns for each mobile wireless communications device, and change a respective rate of polling for each mobile wireless communications device based thereon.

20 Claims, 3 Drawing Sheets

(56) References Cited

U.S. PATENT DOCUMENTS

| | | | |
|---|---|---|---|
| 6,446,114 B1 | 9/2002 | Bulfer et al. | 709/206 |
| 6,549,937 B1 | 4/2003 | Auerbach et al. | 709/206 |
| 6,557,026 B1 | 4/2003 | Stephens, Jr. | 709/203 |
| 6,560,222 B1 | 5/2003 | Pounds et al. | 370/353 |
| 6,615,161 B1 | 9/2003 | Carney et al. | 702/186 |
| 6,615,212 B1 | 9/2003 | Dutta et al. | 707/10 |
| 7,280,537 B2 | 10/2007 | Roy | 370/381 |
| 7,289,495 B2 | 10/2007 | Roy | 370/381 |
| 7,894,425 B2 | 2/2011 | Roy | 370/381 |
| 8,094,592 B2 * | 1/2012 | Roy | 370/310 |
| 2002/0039369 A1 | 4/2002 | Koo | 370/449 |
| 2002/0112007 A1 | 8/2002 | Wood et al. | 709/206 |
| 2002/0143866 A1 | 10/2002 | Lewis | 709/203 |
| 2002/0174194 A1 | 11/2002 | Mooney et al. | 709/219 |
| 2003/0009553 A1 | 1/2003 | Benfield et al. | 709/224 |
| 2003/0140092 A1 | 7/2003 | Caruso et al. | 709/203 |
| 2003/0200264 A1 * | 10/2003 | Brill | 709/206 |
| 2004/0068666 A1 * | 4/2004 | Tosey | 713/201 |
| 2004/0153537 A1 | 8/2004 | Rezvani et al. | 709/223 |

\* cited by examiner

COMMUNICATIONS SYSTEM PROVIDING ADAPTIVE POLLING BASED UPON POSITIVE AND NEGATIVE POLLING EVENTS AND RELATED METHODS

CROSS-REFERENCE TO RELATED APPLICATIONS

This application is a continuation of Ser. No. 11/831,497 filed Jul. 31, 2007 now U.S. Pat. No. 8,094,592, which, in turn, is a continuation of Ser. No. 10/781,195 filed Feb. 18, 2004 now U.S. Pat. No. 7,280,537 issued Oct. 9, 2007, which claims the benefit of U.S. Provisional Application No. 60/493,118, filed Aug. 7, 2003, now U.S. Pat. No. 8,094,592, all of which are hereby incorporated herein in their entirety.

FIELD OF THE INVENTION

The present invention relates to the field of communications systems, and, more particularly, to electronic messaging systems and related methods.

BACKGROUND OF THE INVENTION

Electronic mailboxes are used to store electronic mail (e-mail) messages. Electronic mailboxes are connected to the Internet to enable users to send and receive incoming and outgoing e-mail messages. These mailboxes may also be extended to deliver e-mail to mobile wireless communication devices via wireless networks. In the case of a corporation, electronic mailboxes are typically located on mail servers at the corporation. On the other hand, mailboxes for small businesses or individuals are typically located on mail servers at an Internet service provider (ISP) location.

Mail user agents (MUAs) use a technique called polling to deliver messages from the mail server to the mail program at a user's computer or mobile wireless communications device. A MUA is a program running either on a user's personal computing device (mobile or stationary), or on a shared server that checks for new mail on behalf of a multitude of such users. More particularly, polling is the retrieval of incoming messages from other users at the mail server and delivery of these messages to the user's mailbox.

Mailbox polling generally occurs at different intervals or rates. Furthermore, mailbox polling rates may be customized. That is, corporations and/or Internet service providers may change polling intervals to best meet their particular needs. For example, because e-mails used for business communications are often high priority communications, corporate mail servers may be polled fairly regularly, such as every one to two minutes. On the other hand, ISP mailboxes are typically polled less frequently, e.g., once every fifteen minutes.

Mailbox polling typically occurs synchronously at the mail server at a predetermined interval. Mailboxes on the server are polled to send or receive messages, regardless of whether the mailbox has any new incoming or outgoing messages. In large systems, this traditional polling method may consume large amounts of server resources and thus impact performance.

More particularly, such resource consumption may be split into two parts, namely resource consumption (RC) on a mail server (MS), and on the MUA. RC on MS increases with the frequency of polling, and is particularly demanding when the MUA is running on a mobile wireless device. Such a consumption of resources and associated performance impact is particularly acute when mobile wireless communications devices are used. This is because of the bandwidth constraints associated with the wireless networks over which mobile wireless communications devices communicate with mail servers. For example, a mail server hosting a thousand or more mailboxes may need to communicate message data to several hundred or even thousands of mobile wireless communications devices after each polling interval. This may severely congest the wireless network and cause significant service delays. Furthermore, some mail servers may not be able to adequately support such usage models.

As a result, traditional mailbox polling does not perform particularly well when one or more of the following conditions are met: (1) a large number of mailboxes are being polled; (2) polling frequency is high; (3) MUA is on an network where connections to the MS are slow and/or expensive; and (4) the cumulative workload of polling can overwhelm the capacity of the network. One approach which has been used to address this problem is adaptive polling. Adaptive polling is a more intelligent method of polling mailboxes based upon a triggering event. More particularly, adaptive polling automatically changes the polling interval for a user based on the triggering event(s).

By way of example, U.S. Pat. No. 6,557,026 describes a system for converting information from a text format to an audio format, in which the information is transmitted from a server to a client device via a wired or wireless communications link. In particular, the information relates to "stories" such as news headlines, stock quotes, etc. The server includes a data source monitor which periodically polls data sources to check for new stories based upon polling schedules. The patent notes that the polling schedules may include an adaptive scheduler, which increases the polling frequency with the rate of arrival of new stories. Moreover, the adaptive scheduler reduces the polling rate as the rate of arrival of new stories decreases. Static schedulers are also included, for example, to provide hourly polling during business hours.

Despite such systems, further advancements in polling techniques are desirable to accommodate the ever-increasing usage of mobile wireless communications devices for accessing electronic messages.

SUMMARY OF THE INVENTION

In view of the foregoing background, it is therefore an object of the present invention to provide a communications system providing enhanced adaptive polling techniques and related methods.

This and other objects, features, and advantages in accordance with the present invention are provided by a communications system which may include at least one data storage device for storing messages for respective users, and a plurality of mobile wireless communications devices each associated with a respective user for accessing the messages stored on the at least one data storage device. Moreover, the communications system may further include an adaptive polling engine for polling the at least one data storage device for stored messages and providing the polled messages to mobile wireless communications devices of respective users. The adaptive polling engine may advantageously learn respective user usage patterns for each mobile wireless communications device, and change a respective rate of polling for each mobile wireless communications device based thereon.

By way of example, the user usage patterns may be based upon a time of day and/or a day of the week. In addition, the adaptive polling engine may also change the rate of polling for each mobile wireless communications device based upon at least one positive polling event and at least one negative polling event. For example, the at least one negative polling event may be a lack of authorized communications with the adaptive polling engine, as may be the case when a given mobile wireless communications device is outside a wireless coverage area, or an invalid user login is provided.

Furthermore, the at least one negative polling event may be a decrease in storage of messages for the respective user at the at least one data storage device. Similarly, the at least one positive polling event may be an increase in storage of messages for the respective user at the at least one data storage device, as well as an increase in message access requests from a given mobile wireless communications device.

In particular, the messages may be electronic mail (e-mail) messages, for example. The communications system may also include a wireless network for interfacing the mobile wireless communications devices with the adaptive polling engine. A wide area network (WAN), such as the Internet, may also be used for interfacing the mobile wireless communications devices with the adaptive polling engine, for example.

A method aspect of the invention is for interfacing a plurality of mobile wireless communications devices, each associated with a respective user, with at least one data storage device. The at least one data storage device may be for storing messages for respective users. The method may include polling the at least one data storage device for stored messages and providing the polled messages to mobile wireless communications devices of respective users. Furthermore, the method may also include learning respective user usage patterns for each mobile wireless communications device, and changing a respective rate of polling for each mobile wireless communications device based thereon.

An adaptive polling engine in accordance with the present invention may be for interfacing a plurality of mobile wireless communications devices each associated with a respective user with at least one data storage device. The at least one data storage device may be for storing messages for respective users. The adaptive polling engine may include an interface module for interfacing the adaptive polling engine with the mobile wireless communications devices, and an adaptive polling engine module coupled to the interface device. The adaptive polling engine may be for polling the at least one data storage device for stored messages and providing the polled messages to mobile wireless communications devices of respective users. Moreover, the adaptive polling engine module may learn respective user usage patterns for each mobile wireless communications device and change a respective rate of polling for each mobile wireless communications device based thereon.

A computer-readable medium in accordance with the invention may similarly include an interface module and adaptive polling module, such as those described briefly above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
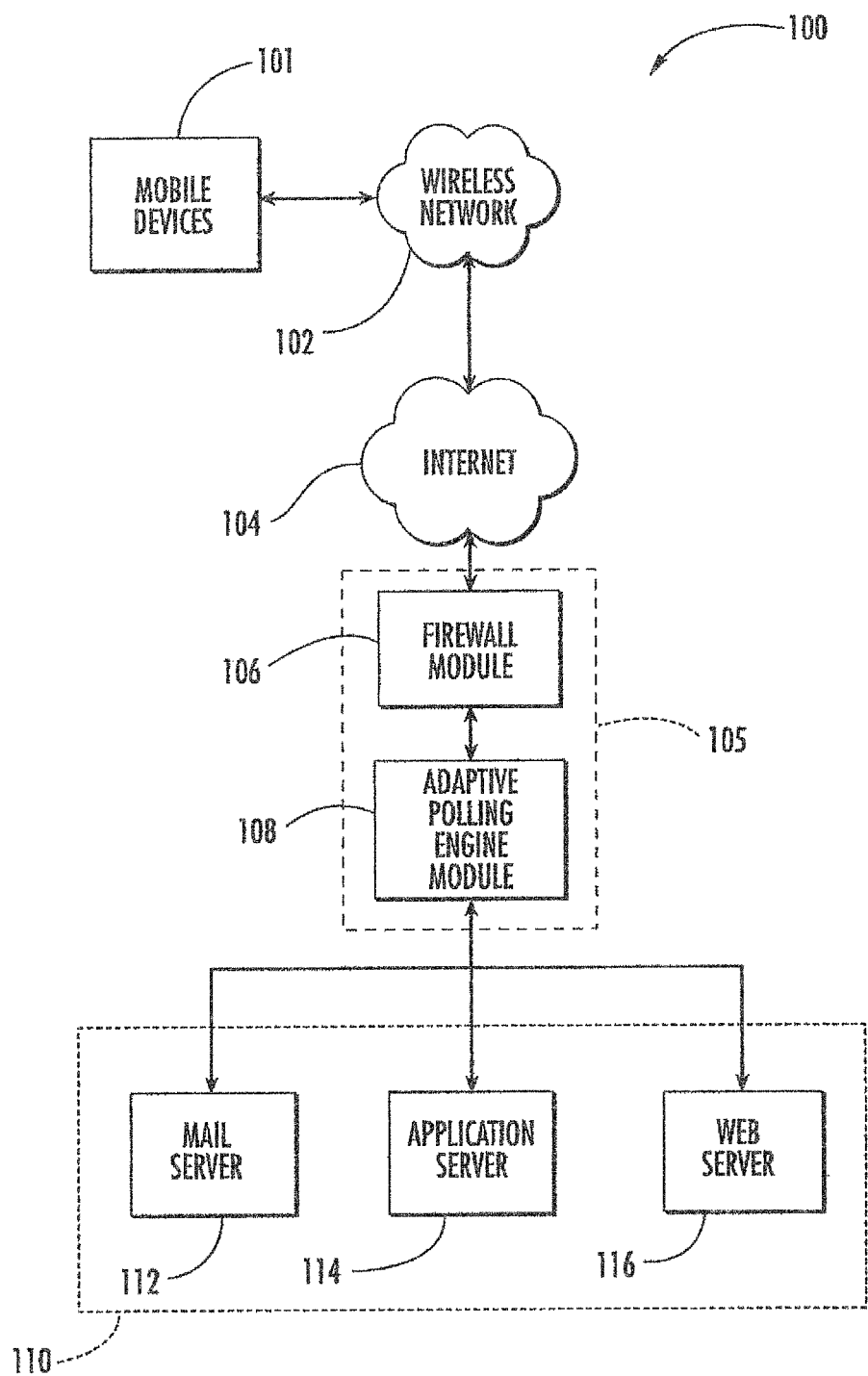
FIG. 1 is a schematic block diagram of a communications system in accordance with the present invention.

Referring initially to FIG. 1, a communications system 100 illustratively includes a plurality of mobile wireless communications devices 101, and a wireless network 102 and a wide area network 104 (e.g., the Internet) for interfacing the mobile wireless communications devices with an adaptive polling engine or server 105. The adaptive polling engine 105 communicates with a plurality of data servers 110, such as a mail server 112, an application server 112, and a Web server 114, for example. Of course, it will be appreciated by those skilled in the art that numerous data servers 110 and types thereof may be used, although only the three servers 112, 114, and 116 are shown in the illustrated example for clarity of illustration.

Figure 3:
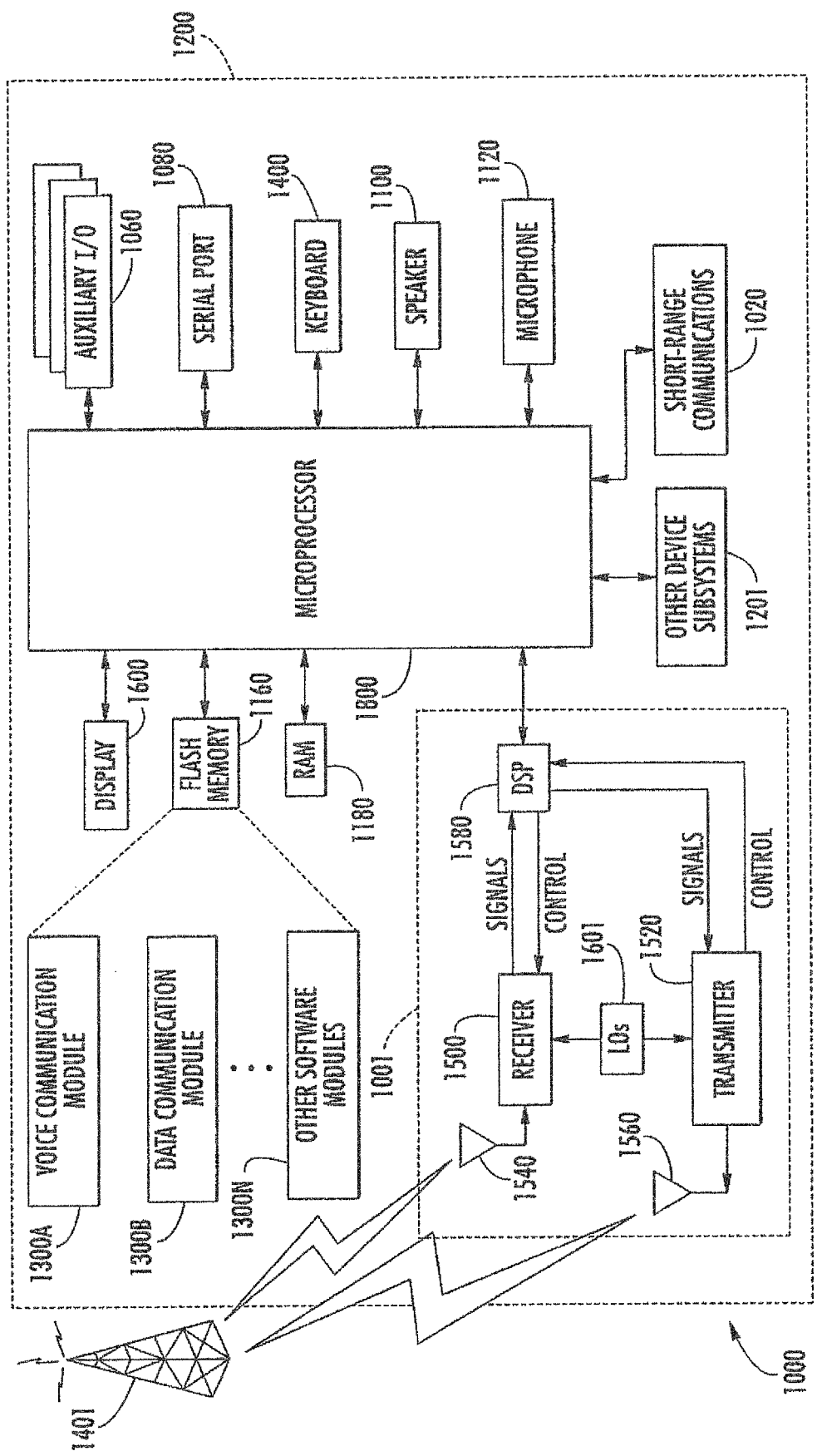
FIG. 3 is a schematic block diagram of an exemplary mobile wireless communications device for use with the present invention.

The mobile wireless communications devices 101 illustratively communicate bi-directionally over the wireless network 102 and the Internet 104 with the adaptive polling engine 108, as will be appreciated by those skilled in the art. It will also be appreciated that the mobile wireless communications devices 101 may not require the Internet 104 to communicate with the adaptive polling engine 108 in all embodiments. By way of example, the mobile wireless communications devices may be personal data assistants (PDAs), cellular telephones, laptop computers with wireless modems, etc. An exemplary mobile wireless communications device 101 suitable for use with the present invention is described in the example provided below with reference to FIG. 3.

The adaptive polling engine 108 illustratively includes an interface module, such as the firewall module 106, to provide secure communications between the mobile wireless communications devices 101 and the data servers 110. The adaptive polling engine also illustratively includes an adaptive polling engine module for performing the adaptive polling operations, as will be discussed further below. By way of example, the adaptive polling engine 105 may be implemented as one or more corporate or ISP servers, and the firewall module 106 and adaptive polling engine module 108 implemented as software modules thereon (i.e., the modules could be on different servers), as will be appreciated by those skilled in the art.

The adaptive polling engine module 108 determines different adaptive polling rates for different users based upon respective user usage profiles thereof. The adaptive polling engine module 108 initially monitors the mail polling interval of the mail server 110. The adaptive polling engine module 108 may also be configured to poll for services and events from other data servers, such as the application server 114 and the Web server 116, as will be appreciated by those skilled in the art.

The adaptive polling engine module 108 uses adaptive polling to automatically poll user mailboxes, which are located on the mail server 112, for new mail. By way of example, the system 100 may be configured to poll the mailboxes at least once every fifteen minutes, although other starting intervals may also be used. However, if the adaptive polling engine module 108 detects recent activity in an end-user's mailbox, the polling interval is preferably shortened to provide new e-mail to the user in a near real-time fashion.

In particular, the adaptive polling engine module 108 queries the mail server 112 for a list of current messages, and it compares this list to prior polling results stored in a database (not shown). If a new message is located, a copy is retrieved from the given server or customer network (e.g., America Online (AOL)). The new updated list of messages is then stored in the database.

Figure 2:
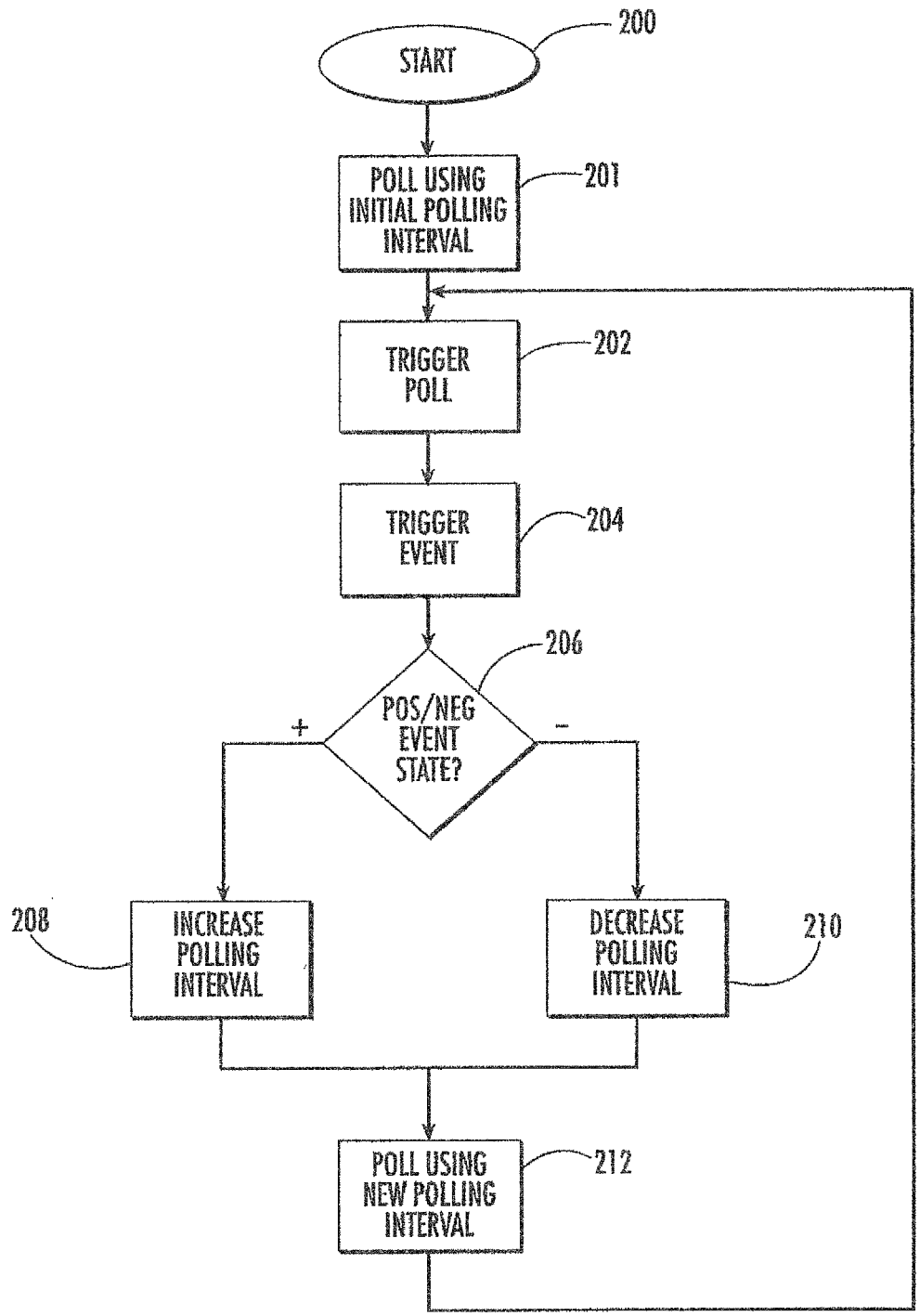
FIG. 2 is a flow diagram illustrating an adaptive polling method in accordance with the present invention.

An adaptive polling procedure in accordance with the present invention is illustrated in FIG. 2. The process begins (Block 200) with the adaptive polling engine module 108 functioning in its initial polling state 201 (i.e., using the default polling interval), at Block 201. The adaptive polling engine module 108 triggers a poll (Block 202) of the mail server 112, which checks for incoming and outgoing mail. The result triggers an event, at Block 204, which is classified as either a positive or negative polling event, at Block 206. The event state is broadcast to the adaptive polling engine module 108 from a given mobile wireless communications device 101, across the wireless network 102 and the Internet 104.

In particular, a positive event increases the polling interval, at Block 208, and a negative event decreases the polling interval, at Block 210. Once the event type is determined, the adaptive polling engine module 108 will operate in its new polling state. If there is further activity, a new poll is triggered (Block 202) and the process flow repeats itself.

A positive polling event is any action that increases the polling interval, i.e., the polling engine 108 will poll the mail server 112 more frequently due to a positive event. Examples of positive events include a new message arriving in the mailbox, and the user checking messages on his mobile wireless communications device. A negative polling event is any action that will decrease the polling interval. That is, the adaptive polling engine module 108 will poll the mail server 112 less frequently (i.e., decrease the polling rate) based upon a negative event.

By way of example, negative polling events may include a lack of authorized communications with the adaptive polling engine module 108 (i.e., a failure to authenticate), such as from an invalid login or password confirmation to connect to the mailbox at the mail server 112 or a given mobile wireless communications device 101 device being outside of a wireless coverage area.

One significant advantage of using the adaptive polling engine module 108 with respect to mobile wireless communications devices is that it conserves bandwidth. More particularly, based upon a positive or negative polling event, the adaptive polling engine module 108 will increase or decrease the polling rate accordingly. If a mobile wireless communications device 101 receives several negative events, the adaptive polling engine module 108 will decrease the polling interval and poll the mail server 112 less frequently, resulting in reduced wireless network 102 utilization. Once a positive event is received, the adaptive polling engine module 108 will revert back to an increased polling interval.

An additional benefit of the communications system 100 is that it may provide the user with a perception of better performance. That is, e-mail messages will appear to arrive more quickly at a mobile wireless communications device 101. For example, if the default polling interval is once every fifteen minutes and a user receives frequent new messages (a positive event), the adaptive polling engine module 108 may increase the polling interval to once every one to two minutes. With this increased polling rate, messages will be transferred more quickly to the user's device, thus giving an impression of better and faster performance.

Based on the specific users and their usage patterns, the adaptive polling engine module 108 may include a module that can learn and adapt to a user's usage pattern based on the time of day, day of the week, and/or a heuristic comparison of previous usage activities at that time. The adaptive polling engine module 108 can learn the user's routine and automatically configure polls for his mobile device. For example, a busy user may have the adaptive polling engine module 108 set a positive event (i.e., increasing the rate of polling) first thing in the morning to download all his incoming messages, another positive event before he leaves for the end of the day, and set negative events (i.e., decreasing the rate of polling) after work until sunrise.

EXAMPLE

An exemplary hand-held mobile wireless communications device 1000 that can be used in the present invention is further described in the example below with reference to FIG. 18. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

In addition to the processing device 1800, other parts of the mobile device 1000 are shown schematically in FIG. 18. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information. The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for providing e-mail messages to a mobile wireless communications device, comprising:
    polling an e-mail data storage device for e-mail messages stored at the e-mail data storage device;
    changing a rate of polling based upon a negative polling event comprising the mobile wireless communications device being outside of a wireless coverage area; and
    providing the polled e-mail messages to the mobile wireless communications device.

2. The method of claim 1 further comprising also changing the rate of polling based upon an invalid user login.

3. The method of claim 1 further comprising also changing the rate of polling based upon at least one positive polling event.

4. The method of claim 3 wherein the at least one positive polling event comprises an increase in e-mail message access requests from the mobile wireless communications device.

5. The method of claim 1 further comprising changing the rate of polling further based upon a decrease in storage of e-mail messages at said e-mail data storage device.

6. The method of claim 1 wherein polling, changing and providing are performed using a polling server.

7. The method of claim 6 wherein the polling server comprises an interface configured to communicate with the mobile wireless communications device; and a polling engine coupled to the interface.

8. The method of claim 1 wherein the mobile wireless communications device comprises a cellular telephone.

9. A method for providing e-mail messages to a mobile wireless communications device, comprising:
    polling an e-mail data storage device for e-mail messages stored at the e-mail data storage device;
    changing a rate of polling based upon a negative polling event including an invalid user login for the mobile wireless communications device; and
    providing the polled e-mail messages to the mobile wireless communications device.

10. The method of claim 9 wherein the negative polling event comprises a decrease in storage of messages.

11. The method of claim 9 wherein the positive polling event comprises an increase in storage of messages.

12. The method of claim 9 wherein the positive polling event comprises an increase in e-mail message access requests from the mobile wireless communications device.

13. The method of claim 9 wherein polling, changing and providing are performed using a polling server.

14. The method of claim 13 wherein the polling server comprises an interface configured to communicate with the mobile wireless communications device; and a polling engine coupled to the interface.

15. The method of claim 9 wherein the mobile wireless communications device comprises a cellular telephone.

16. A method for providing e-mail messages to a mobile wireless communications device, comprising:
   polling an e-mail data storage device for the e-mail messages stored at the e-mail data storage device;
   changing a rate of polling based upon a positive polling event comprising checking for e-mail messages at the mobile wireless communications device; and
   providing the polled e-mail messages to the mobile wireless communications device.

17. The method of claim 16 wherein the positive polling event further comprises an increase in storage of messages.

18. The method of claim 16 wherein polling, changing and providing are performed using a polling server.

19. The method of claim 18 wherein the polling server comprises an interface configured to communicate with the mobile wireless communications device; and a polling engine coupled to the interface.

20. The method of claim 16 wherein the mobile wireless communications device comprises a cellular telephone.

* * * * *